July 22, 1941.                H. PRIESTER                2,250,273
                         BRICK UNIT HANDLING FORK
                          Filed Sept. 14, 1940          5 Sheets-Sheet 1
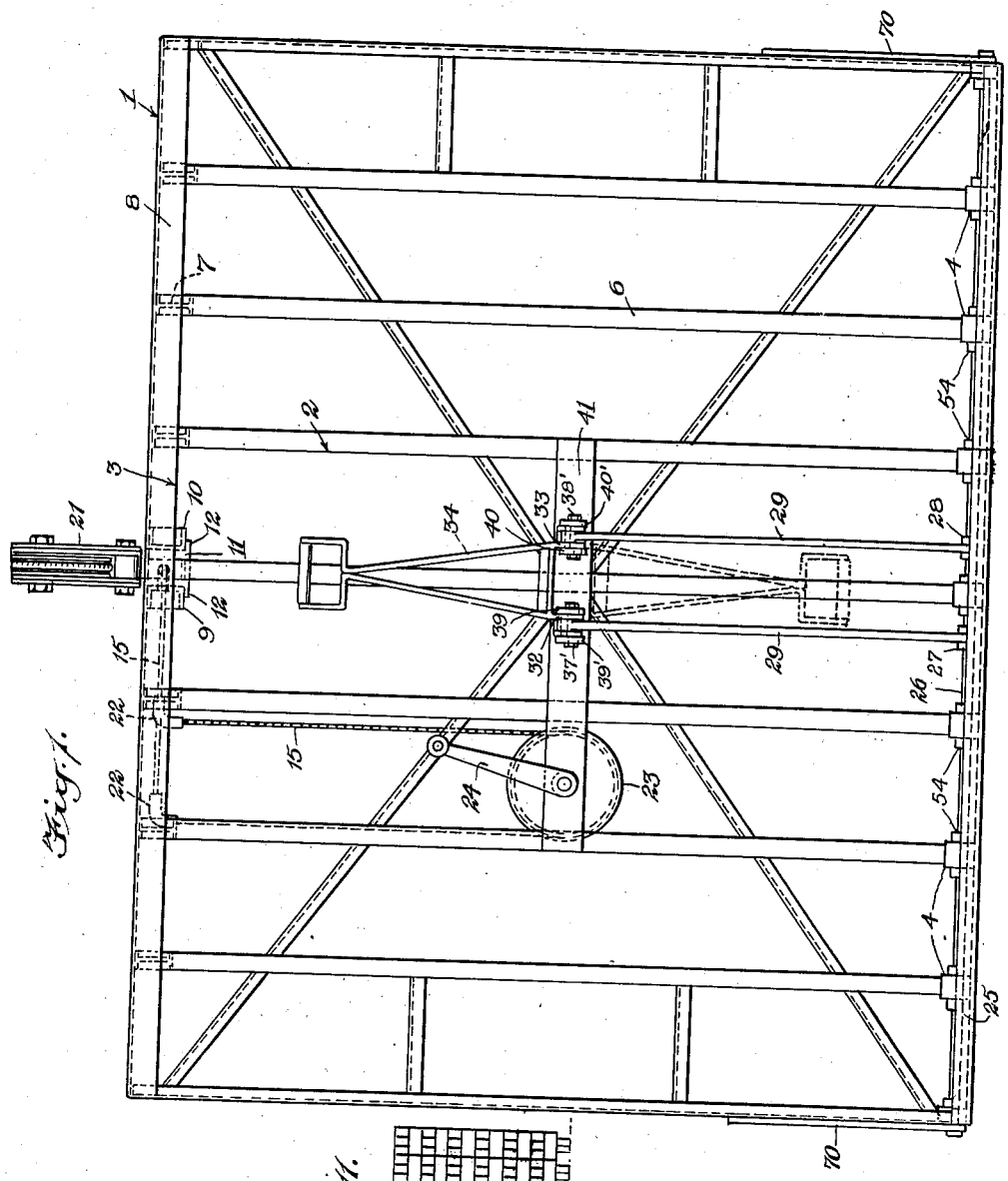
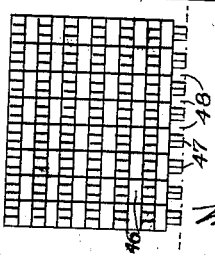
WITNESSES
INVENTOR
Henry Priester
BY
ATTORNEYS July 22, 1941.    H. PRIESTER    2,250,273
BRICK UNIT HANDLING FORK
Filed Sept. 14, 1940    5 Sheets-Sheet 2
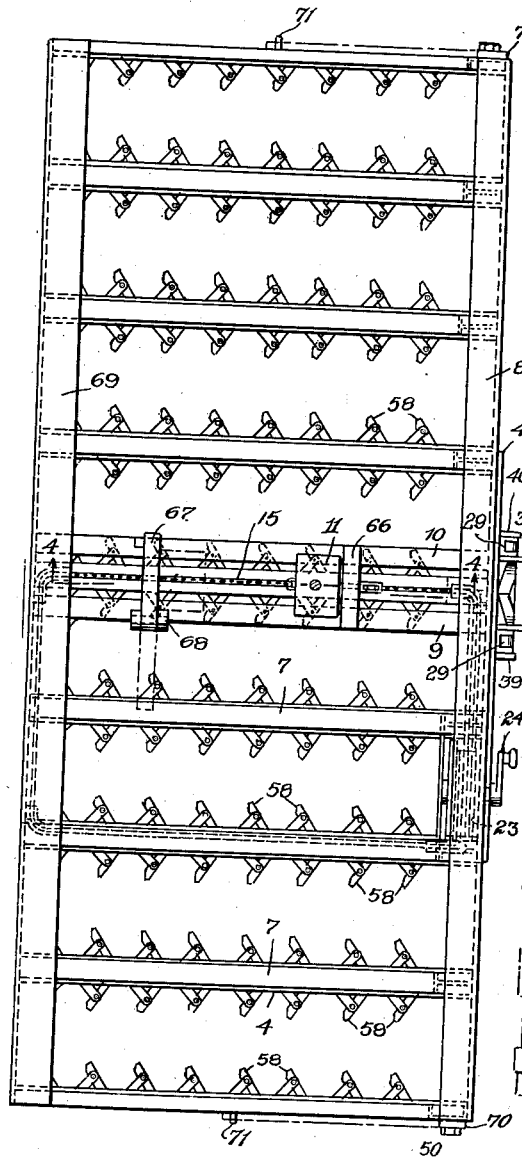
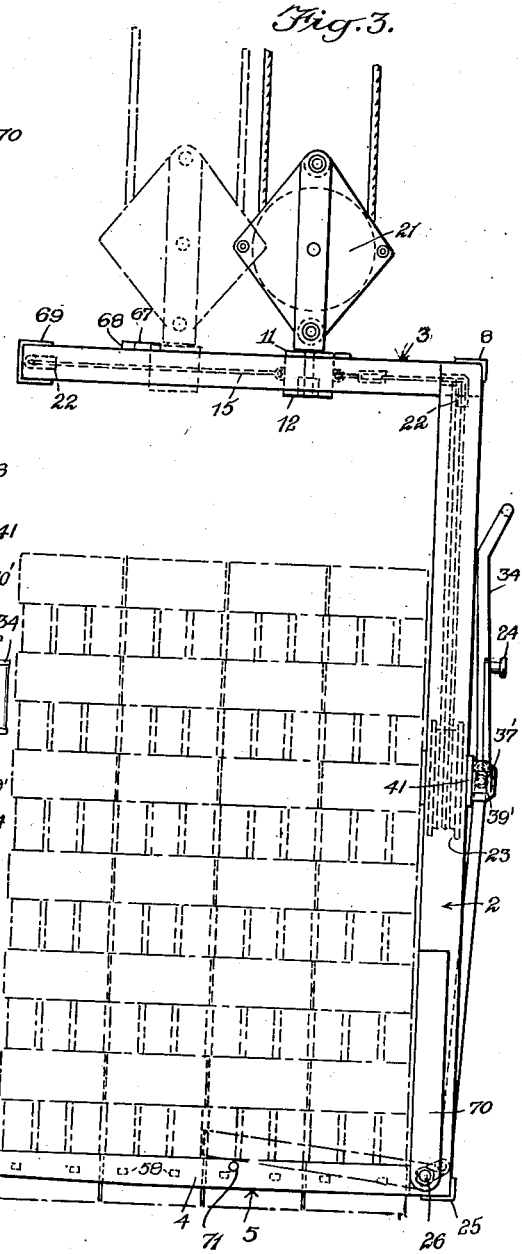
INVENTOR
Henry Priester
BY
ATTORNEYS

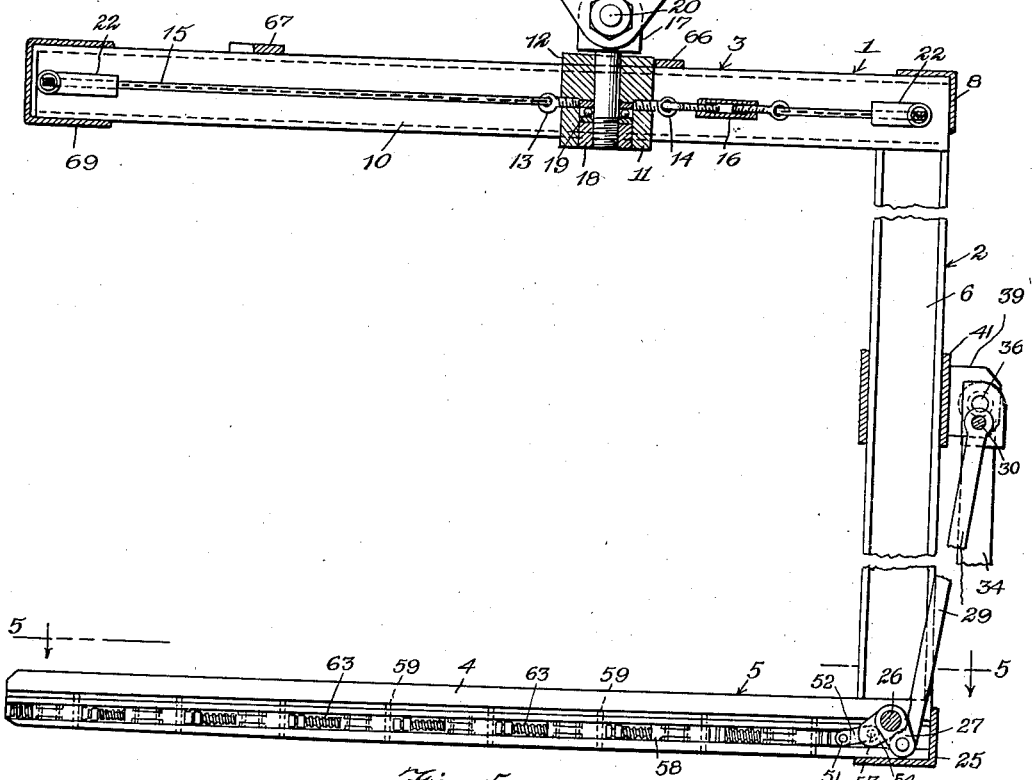
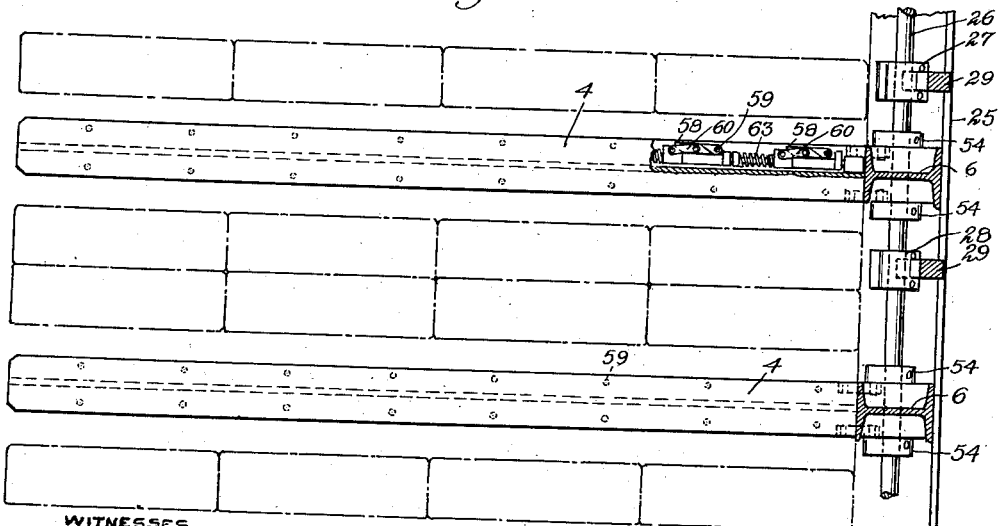

July 22, 1941.  H. PRIESTER  2,250,273
BRICK UNIT HANDLING FORK
Filed Sept. 14, 1940   5 Sheets-Sheet 4
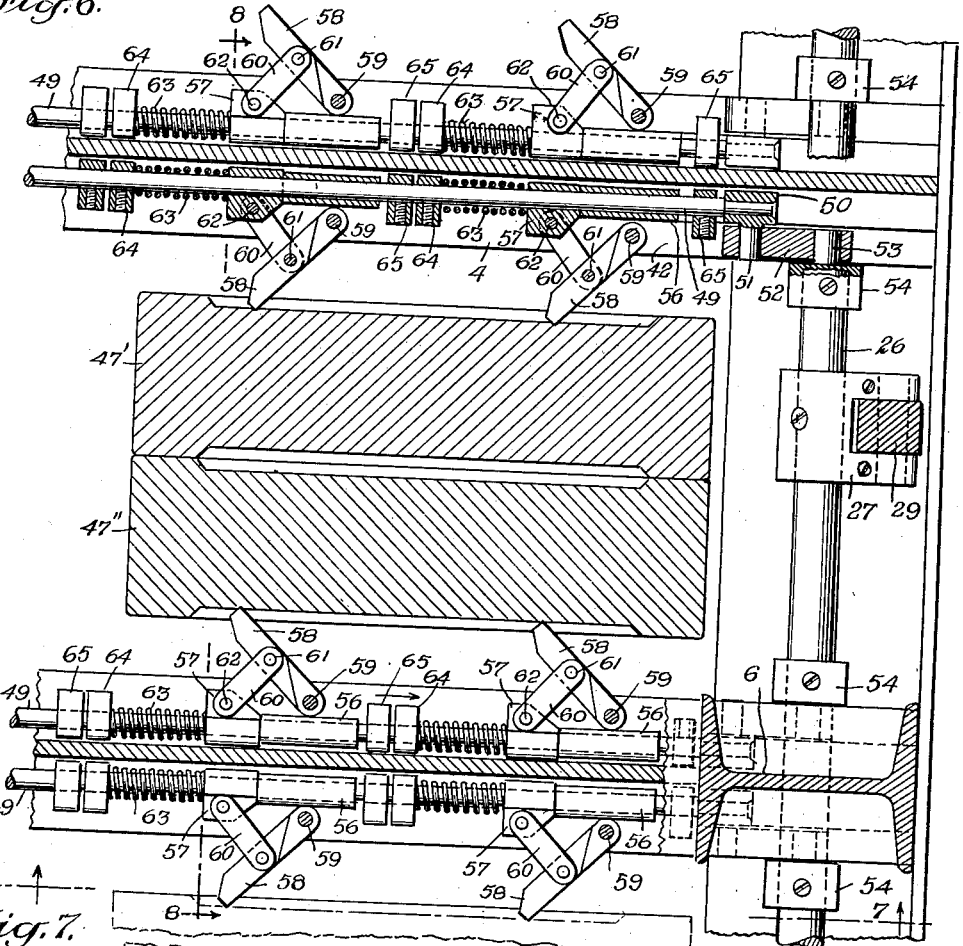
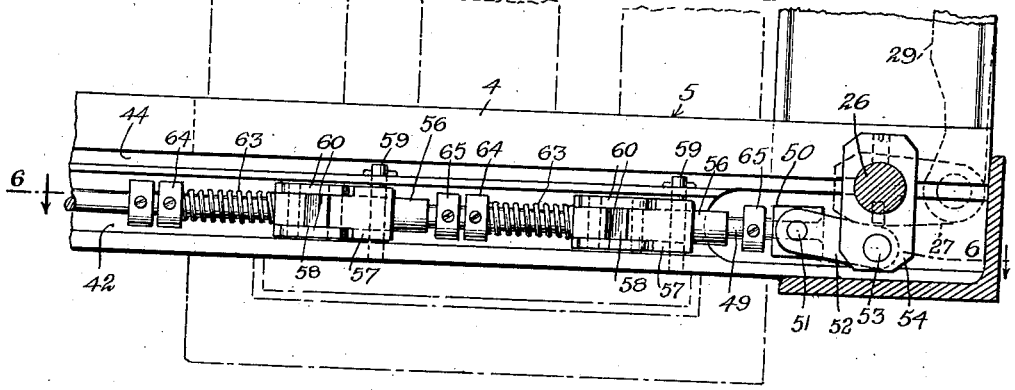
WITNESSES
INVENTOR
Henry Priester
BY
ATTORNEYS July 22, 1941.   H. PRIESTER   2,250,273
BRICK UNIT HANDLING FORK
Filed Sept. 14, 1940   5 Sheets-Sheet 5

WITNESSES

INVENTOR
Henry Priester
BY
Munn, Anderson & Liddy
ATTORNEYS

Patented July 22, 1941

2,250,273

UNITED STATES PATENT OFFICE 2,250,273

BRICK UNIT HANDLING FORK

Henry Priester, Middletown, N. Y.

Application September 14, 1940, Serial No. 356,801

8 Claims. (Cl. 294—63)

This invention relates to devices for lifting and carrying brick and particularly to an improved brick-handling fork adapted to handle a stack of brick as a unit so that the bricks may be raised, transported and lowered into position without disturbing the arrangement thereof.

Another object of the invention is to provide an improved brick unit handling fork whereby a plurality of tines are provided adapted to be slid between rows of specially arranged brick so as to engage the brick and raise the same together with any brick superimposed thereon.

A further object of the invention is to provide a brick-handling fork formed with a substantially rectangular frame including spaced tines at the bottom and manually actuated means carried by the tines for gripping brick between the tines in order to raise and transport the same together with anything on top thereof from one place to another.

In the accompanying drawings—

Fig. 1 is a rear elevation of the back of the fork embodying the invention;

Fig. 2 is a top plan view of the fork used in Fig. 1, the hoist being eliminated;

Fig. 3 is an end view of the structure shown in Fig. 1;

Fig. 4 is an enlarged sectional view through Fig. 2 approximately on the line 4—4;

Fig. 5 is a sectional view through Fig. 4 approximately on the line 5—5;

Fig. 6 is a sectional view through Fig. 7 approximately on the line 6—6;

Fig. 7 is a sectional view through Fig. 6 approximately on the line 7—7, the same illustrating an enlarged view of one pair of brick-gripping members and associated parts embodying certain features of the invention;

Fig. 10 is a detail fragmentary view partly in section showing a link and crank arm embodying certain features of the invention;

Fig. 11 is a side view on a reduced scale of a specially arranged pile of brick designed to be engaged and raised by the fork shown in Fig. 1.

Figure 8:
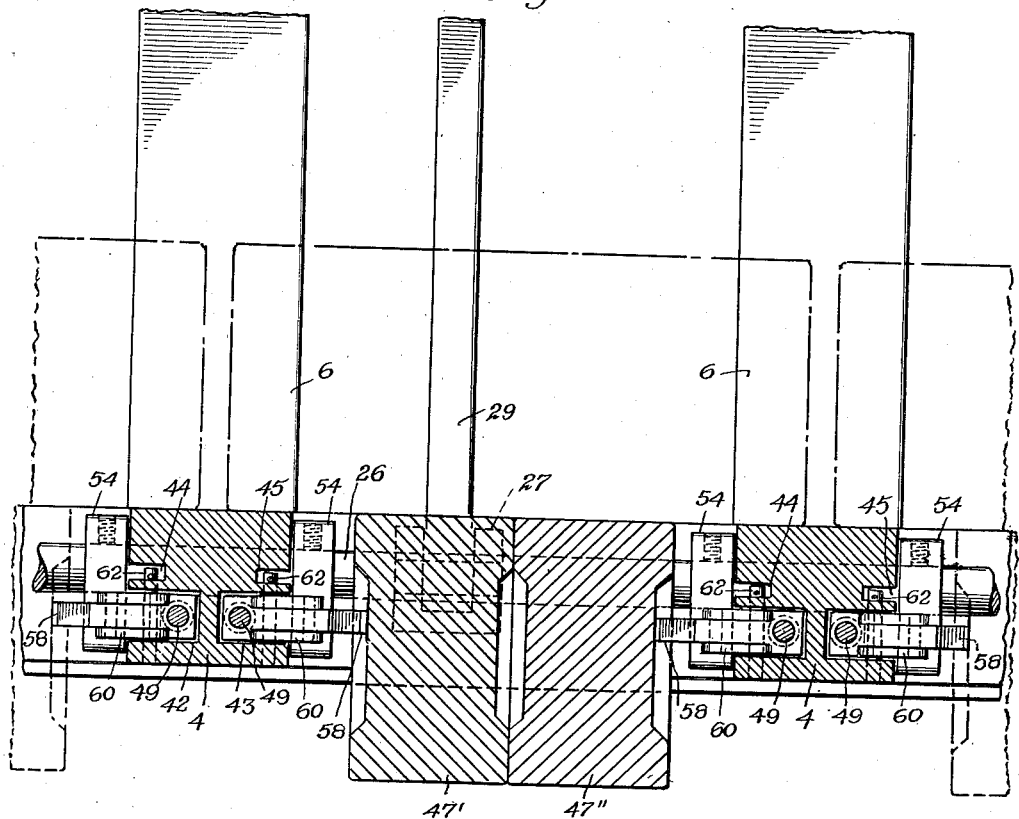
Fig. 8 is a sectional view through Fig. 6 approximately on the line 8—8.

Referring to the accompanying drawings by numerals, 1 indicates a frame which is provided with a back or back structure 2, a top 3, and a bottom structure 4 which consists of a number of straight parallel tines 5. By referring to Fig. 4, it will be seen that the tines 5 constituting the bottom structure 4 in the present instance consist of a group of nine tines, there being seven inner or intermediate tines and two outer tines. The back 2 is made up of a number of I-beams 6 which are welded or otherwise rigidly secured to I-beams 7 forming the top 3. An angle iron 8 is arranged at the juncture of the back and top and is preferably welded to both the I-beams 6 and I-beams 7. Centrally of the top 3 there is provided a pair of oppositely facing channel irons 9 and 10 which form a runway for the lifting block 11. The block 11 is provided with underlapping flanges 12, as shown in Fig. 1, and eye-bolts 13 and 14 to which are secured portions of an endless cable 15. This cable may be textile or metal, or it may be a chain without departing from the spirit of the invention. A turnbuckle 16, as shown in Fig. 4, is used to maintain this cable in proper functioning condition. An eye-bolt 17 extends into the block 11, as shown in Fig. 4, and is rotatably held therein by a nut 18 which bears against suitable bearing members 19. The aperture of the eye-bolt 17 is adapted to receive a pivot bolt 20 which is connected with any suitable form of hoist 21.

When the fork is to be transported, the hoist 21 is used for raising and transporting the same either empty or loaded. Sometimes the fork is provided with different size loads and sometimes loads are nearer the outer end than the back and, consequently, the hoist block 11 is adapted to be shifted longitudinally of the channel irons 9 and 10. This is done by means of the cable 15. The cable 15 passes through any desired number of tubular angle guides 22 and around a drum 23 to which it is connected at one point. A hand-actuated crank 24 is connected with drum 23 so that when this crank is rotated in one direction the hoist block 11 will be moved toward the back 2 and when rotated in the opposite direction it will be moved away from back 2 so that the hoist 21 may act against substantially the center of gravity of the load.

Figure 9:
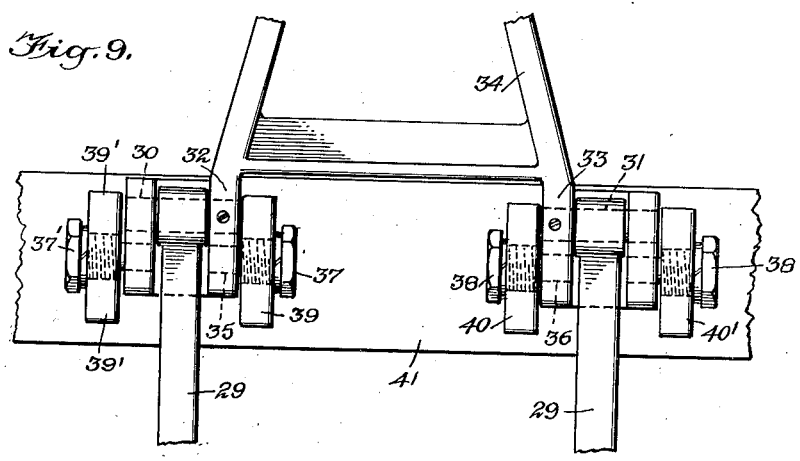
Fig. 9 is an enlarged fragmentary elevation of an eccentric structure shown in Fig. 1 and forming part of the hand control of the grippers shown in Figs. 6 and 7.

At the lower edge of the back 2 there is provided an angle bar 25 which is welded to the various vertical I-beams 6 and also to the various tines 5. These tines are also preferably welded to the I-beams 6 so that a strong, rigid structure is provided. Extending through the overlapped parts of the I-beams 6 and the tines 5 is a rock shaft 26. A pair of special crank arms 27 and 28 are keyed or otherwise rigidly secured to this shaft. A link 29 is pivotally connected to the outer end of each of the crank arms 27 and 28 and these links extend upwardly, as shown in Figs. 1, 4 and 9, to substantially the center of the back where they are journaled on the respective pins 30 and 31. These pins are rigidly secured to the lower extensions 32 and 33 of a hand lever 34. The extreme lower ends of the extensions 32 and 33 are pivotally mounted at 35 and 36 on suitable bearing pins 37 and 38 carried by brackets 39 and 40, which brackets are rigidly secured to a cross piece 41. Coacting brackets 39' and 40' support coacting pins 37' and 38'. By reason of this construction, when the hand lever 34 is in its elevated position, as shown in Fig. 1, the parts are past dead center so that the links 29 are locked in their functioning position. When the hand lever 34 is lowered to the position shown in Fig. 4 and in dotted lines in Fig. 1, the links 29 are in their lowered position and as the links 29 move upwardly and downwardly the rock shaft 26 is rocked one way or the other. When the rock shaft is rocked in one direction by moving the hand lever 34 to its highest position, the parts will move past dead center, as shown in Fig. 9, and, consequently, the rock shaft will be locked against a return movement. The parts are so proportioned that the gripping members for gripping the brick to be carried will be in their full gripping position when the hand lever 34 is in its highest position.

Each of the inner tines 5, as shown particularly in Fig. 8, is a modified I-beam and has comparatively large grooves 42 and 43 and small grooves 44 and 45. The two outer tines are of modified construction in that each has one large groove and one small groove, to accommodate only one set of grippers along the inside thereof, as distinguished from each of the inner tines which has a set of grippers distributed along each side thereof. As all the inner tines are constructed alike, a description of one will apply to all. Arranged in the grooves just mentioned are grippers or gripping members adapted to grip specially arranged brick when a pile of brick is to be raised and transported. As shown in Fig. 11, a pile of brick 46 is supported by rows of brick 47. Each of these rows of brick, except the outer rows, consists of two rows or layers thereof and between the various rows are arranged openings 48. When the fork is to be used the tines 5 are slid into the openings 48 and then the gripping members, shown particularly in Figs. 6 and 7, are caused to function, whereby the brick 47 are engaged by the gripping members. The gripping members are moved to functioning position as shown in Fig. 6 by the lever 34. When in its functioning position the fork may be raised and transported and as it is raised the various rows of brick 47 on which the pile or stack 46 is mounted will be raised and carried to the desired location.

Quite often brick are stacked on a small brick wagon in the brick yard and then transported to the kiln to be burned. Heretofore it was necessary to place the bricks one or two at a time on the brick wagon and then to remove the same one or two at a time from the wagon to the kiln. By means of the present invention, the bricks are arranged by hand on the brick wagon and the wagon is moved to a position near the kiln, after which the tines 5 of the fork are slid into the various openings 48. The entire stack of brick is then moved as a unit and deposited as a unit in the kiln. This saves much time and also avoids injury to the brick as well as provides open spaces for the heat in the kiln to pass between the bricks. After the bricks have been burned in the usual way the various stacks of brick may be removed in the same way and deposited in a truck to be hauled away. It will therefore be seen that after the unburned bricks have been arranged on a small brick wagon they are not touched by the hand of the workman until after they have been loaded on the truck or barge to be transported to the building operations.

Arranged in each of the openings 42 and 43 there is provided a rod 49 riveted or otherwise rigidly secured to a block 50, as shown in Figs. 6 and 10. The block 50 is provided with a journal pin 51 on which one end of link 52 is pivotally mounted. The other end of link 52 is pivotally mounted on a pin 53 carried by the outer end of a crank arm 54 rigidly secured to the rock shaft 26. Arm 54 may be secured by a key or a set screw 55 as preferred. It will be understood that the mechanisms in each of the grooves 42 and 43 of the various tines are identical so that a description of one will apply to all.

As shown in Fig. 6, the rod 49 carries a sleeve 56 resting against the sliding block 57 also on the rod 49. These two members slide on the rod 49 when permitted. A gripping arm 58 is pivotally mounted at 59 on the tine 5 and has a link 60 pivotally connected therewith at 61. Link 60 is pivotally connected at 62 to the block 57. A spring 63 acts on block 57 to urge the same to the right, as shown in Fig. 6. An abutment 64 is rigidly secured in any suitable manner to rod 49, as for instance, by means of set screws, so that whenever the rod 49 is moved to the right, as shown in Fig. 6, by reason of the action of the rock shaft 26, the gripping arm 58 will press against the brick 47' which is arranged alongside the brick 47''. Preferably there are two arms 58 and associated parts carried by rod 49 for each brick 47' and 47'', whereby there will be ample gripping action near each end of each brick. After the bricks have been grasped by the arms 58, the fork may be raised and transported as desired. When the operator wishes to remove the fork from a pile of brick, he swings the lever 34 downwardly to the dotted position shown in Fig. 1. This will cause the rod 49 to move to the left, as shown in Fig. 6. An abutment 65 is rigidly secured to rod 49 so that sleeve 56 and associated parts are forced to the left and, consequently, link 60 will swing the arm 58 inwardly to the position within the groove 42 so that the brick will be completely released and there will be no protuberances extending outwardly from the various tines 5.

When the parts are moved to the position shown in Fig. 6, the pull of the link 52 is through the abutment 64 and against spring 63, whereupon the arm 58 will be yieldingly but firmly forced outwardly. The use of this comparatively strong spring acts to take care of any irregularities in the bricks or the thickness thereof.

When the hand-actuated lever 34 is in its non-functioning position, as indicated by dotted lines in Fig. 1, all the arms 58 are nested as indicated particularly in Fig. 5. It will be noted that the long links 29 function to rock the rock shaft 26. The rock shaft 26 has two crank arms 54 for each tine except the two outer tines. The two outer tines are provided with one row of gripping arms 58 and these arms face toward the center of the frame 1.

Referring particularly to Fig. 2, it will be seen that a permanent abutment 66 is connected with the channel irons 9 and 10 so as to limit the block 11 in its movement in one direction. In the opposite direction there is provided a swinging abutment 67 which normally limits the swinging movement, but when only a half-load or a quarter-load is being raised the abutment 67 may be swung on its pivotal mounting 68 to the dotted position shown in Fig. 2 and the block 11 allowed to move over to the channel iron 69 at the outer end of the top 3. Bars 70 constituting abutments are disposed at opposite ends respectively of the frame 1. Each bar has one end thereof pivotally connected with the related end of the rod 26 so that it may be swung to a vertically disposed inactive position, as indicated in full lines in Fig. 3, or be swung to a substantially horizontally disposed active position, as indicated in dot-and-dash line in Fig. 3. Each bar 70 is held in the inactive position by frictional contact with the back 2, and is held in its active position by a pin 71 carried by the related outer tine. The bars 70 in their active position will engage a stack of brick and thus limit the insertion of the tines between rows thereof to an extent that bricks will be carried only on the outer or forward ends of the tines. In this manner the fork may be used for handling less than a full load.

I claim:

1. A brick unit handling fork including a frame having a top, a back, and a plurality of straight parallel tines extending beneath the top from the lower edge of said back, a plurality of brick-gripping members carried by each of said tines, a rock shaft carried by said back adjacent the lower edge, means for rocking said rock shaft, said means being formed to lock itself when moved to functioning position, and means actuated by said rock shaft for causing said gripping members to function.

2. A brick unit handling fork including a plurality of straight parallel carrying tines, a plurality of brick-gripping structures carried by each of said tines, a reciprocating rod for causing said gripping structures to function, a link pivotally connected to one end of each of said rods, a rock shaft arranged adjacent the ends of said tines, a crank arm for each of said links rigidly secured to said rock shaft, means for pivotally connecting the respective links with the respective crank arms, and means for actuating said rock shaft.

3. A brick unit handling fork including a frame having a row of tines at the bottom, means carried by said tines for gripping and holding brick, a back upstanding from one end of said tines, a top carried by the upper end of said back positioned to extend substantially parallel to said tines, a single suspension lifting pivot block carried by said top, means for shifting said block toward and from said back according to the center of gravity of the frame and load carried thereby, mechanism for causing said means to function, and a swinging abutment on said back adapted to be substantially in the same plane as said back when in non-functioning position and adapted to be substantially parallel with the upper surface of said tines when in a functioning position for causing the loading of brick only on the outer ends of the tines.

4. A brick unit handling fork including a frame having a row of tines at the bottom, means carried by said tines for gripping and holding brick, a back upstanding from one end of said tines, a top carried by the upper end of said back positioned to extend substantially parallel to said tines, a lifting block carried by said top, means including a member functioning as a cable for shifting said block toward and from said back according to the center of gravity of the frame and load carried thereby, and a hand-actuated mechanism for causing said cable to function.

5. A brick handling fork including a lifting frame, brick supporting, gripping and releasing means carried by said frame, suspension lifting means connected with the frame for lifting the same and shiftable according to the center of gravity of the frame and load carried thereby, and means on the frame for positioning the fork with respect to a load of bricks so as to handle less than a full load.

6. In a brick handling fork, a lifting frame, and suspension lifting mechanism shiftably connected with said frame, said mechanism including a lifting block slidably connected with the frame, a guided cable carried by the frame and having its opposite ends connected with opposite ends respectively of said block, and means operable to operate said cable to shift said block in relation to said frame.

7. In a brick handling fork, spaced tines, each tine having thereon pivoted brick-engaging fingers, an axially movable rod, a sliding block on the rod for each of said fingers, a link having its opposite ends pivotally connected with said block and its finger respectively, an abutment fixed on said rod, a compression spring surrounding said rod and having its opposite ends bearing on said block and abutment respectively to cause the movement of the finger to a brick-engaging position through the intervention of said block and link when said rod is moved axially in one direction, and means on said rod to cause each finger to move to a retracted position through the intervention of its block and link when the rod is moved axially in the other direction.

8. In a brick handling fork, spaced tines, each tine having thereon pivoted brick-engaging fingers, an axially movable rod, a sliding block on the rod for each of said fingers, a link having its opposite ends pivotally connected with said block and its finger respectively, an abutment fixed on said rod, a compression spring surrounding said rod and having its opposite ends bearing on said block and abutment respectively to cause the movement of the finger to a brick-engaging position through the intervention of said block and link when said rod is moved axially in one direction, means on said rod to cause each finger to move to a retracted position through the intervention of its block and link when the rod is moved axially in the other direction, and manually operable means connected with said rod to cause the axial movement of the rod as aforesaid and to hold the rod against movement.

HENRY PRIESTER.